(12) United States Patent
Fräulin et al.

(10) Patent No.: US 9,410,650 B2
(45) Date of Patent: Aug. 9, 2016

(54) RECEIVING PART OF A COUPLING FOR A FLUID LINE

(75) Inventors: Christian Fräulin, Waldkirch (DE); Martin Kurth, Kandern (DE); Oliver Laux, Lörrach (DE); Stefan Schulz, Lörrach (DE); André Bülau, Stuttgart (DE)

(73) Assignee: A. Raymond et Cie, Grenoble (FR)

( * ) Notice: Subject to any disclaimer, the term of this patent is extended or adjusted under 35 U.S.C. 154(b) by 395 days.

(21) Appl. No.: 14/232,507

(22) PCT Filed: Jul. 2, 2012

(86) PCT No.: PCT/EP2012/062839
§ 371 (c)(1),
(2), (4) Date: Jan. 13, 2014

(87) PCT Pub. No.: WO2013/007552
PCT Pub. Date: Jan. 17, 2013

(65) Prior Publication Data
US 2014/0131998 A1    May 15, 2014

(30) Foreign Application Priority Data
Jul. 14, 2011   (DE) .......................... 10 2011 107 186

(51) Int. Cl.
*F16L 35/00* (2006.01)
*F16L 37/098* (2006.01)
*F16L 37/00* (2006.01)

(52) U.S. Cl.
CPC .............. *F16L 37/098* (2013.01); *F16L 37/00* (2013.01); *F16L 37/0985* (2013.01); *F16L 2201/10* (2013.01)

(58) Field of Classification Search
CPC ..... F16L 37/098; F16L 37/00; F16L 37/0985; F16L 2201/10; F16L 37/0982; F16L 37/0987; F16L 37/088
USPC .......................................................... 285/93
See application file for complete search history.

(56) References Cited

U.S. PATENT DOCUMENTS

| | | | | |
|---|---|---|---|---|
| 2,327,611 A * | 8/1943 | Schelwer | ............ | F16L 37/0982 251/149.6 |
| 5,511,827 A * | 4/1996 | Steinkamp | .......... | F16L 37/0985 285/308 |
| 2004/0084107 A1* | 5/2004 | Guest | .................. | F16L 37/0985 141/346 |
| 2007/0029796 A1* | 2/2007 | Bibby | ................. | F16L 37/0982 285/308 |
| 2007/0209716 A1* | 9/2007 | Rankin | ............... | F16K 37/0033 137/554 |
| 2011/0018254 A1* | 1/2011 | Kuck | .................. | F16L 37/0985 285/31 |

FOREIGN PATENT DOCUMENTS

DE   102008014255 B3   1/2006
DE   102009043088 B3   3/2011

OTHER PUBLICATIONS

Translation of DE 10 2008 014255 found on espacenet.com.*
International Search Report and Written Opinion of the PCT parent application PCT/EP2012/062839.

* cited by examiner

*Primary Examiner* — Brian Mattei
(74) *Attorney, Agent, or Firm* — Faegre Baker Daniels LLP

(57) ABSTRACT

An electric resonant circuit is provided in a receiving part of a coupling for a fluid line, the resonant circuit interacting with a tuning device in a contactless manner. In an intermediate position of an insert part, which differs from a closed position, the resonant circuit has a resonant frequency that differs from the characteristic closure frequency, and in the closed position the resonant circuit has the characteristic closure frequency. The tuning device acts on the inductance of the electric resonant circuit. An acting part is provided that mechanically acts on the coil when the insert part is inserted into the receiving part such that the shape of the coil in the closed position differs from the shape of the coil in the intermediate position.

9 Claims, 10 Drawing Sheets

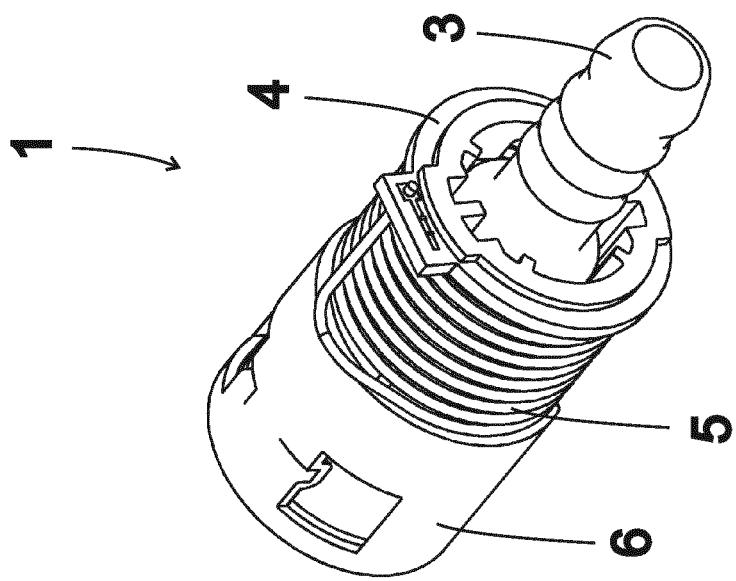
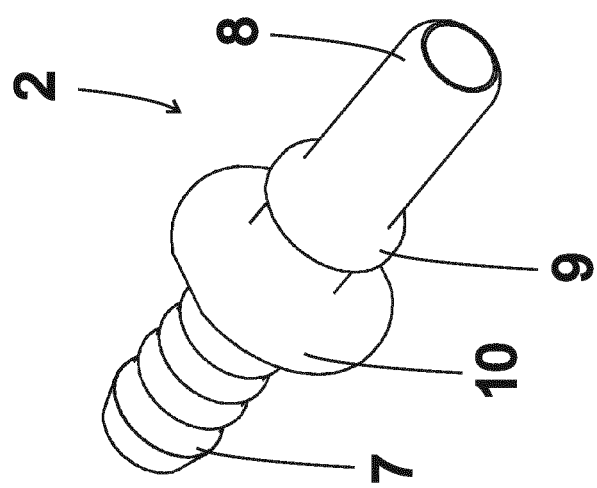
Fig. 1

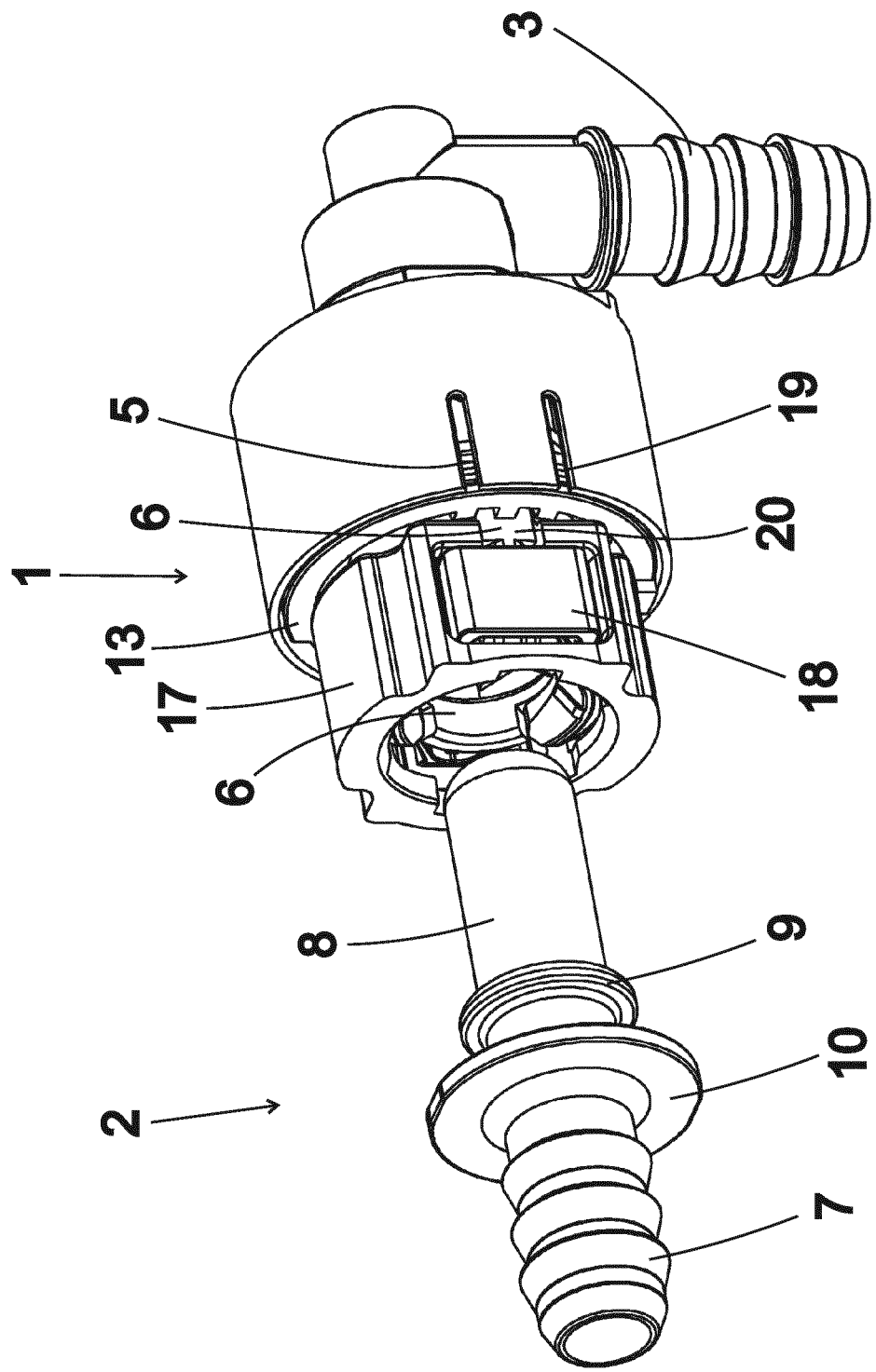

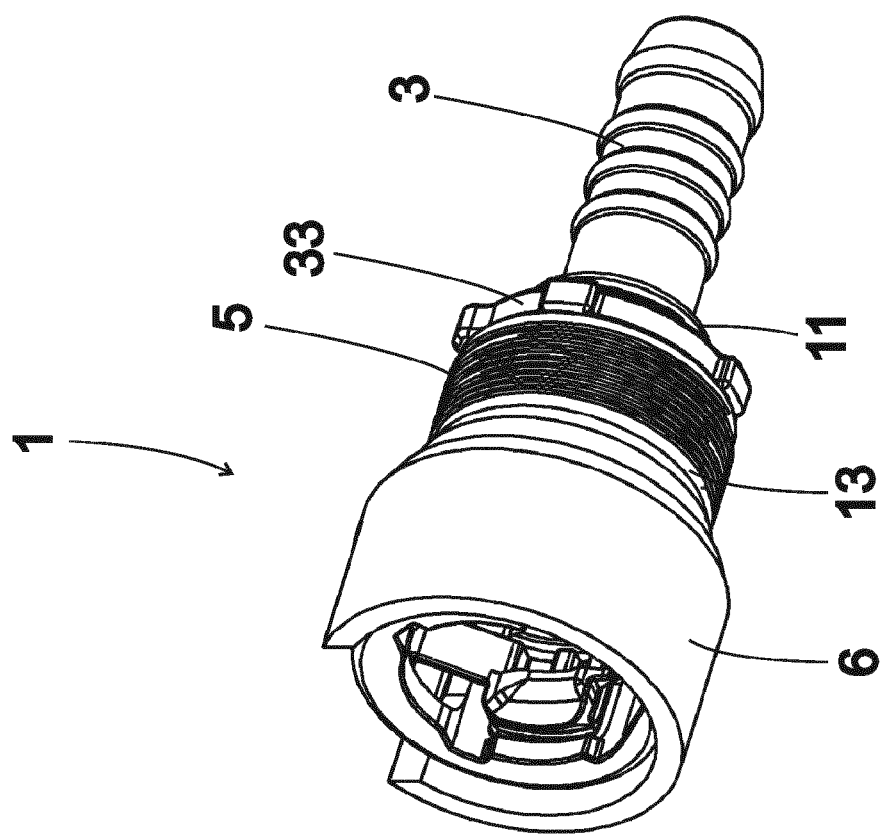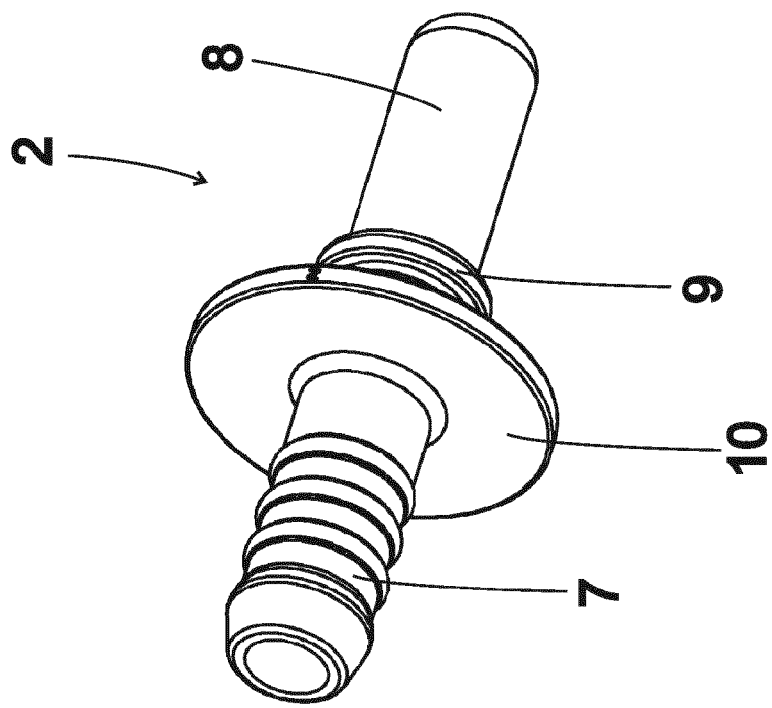
Fig. 9

RECEIVING PART OF A COUPLING FOR A FLUID LINE

The invention is directed to a receiving part of a coupling for a fluid line according to the preamble of Claim 1.

Such a receiving part is known from DE 10 2008 014 255 B3. The receiving part of the coupling has an electric resonant circuit that interacts contactlessly with a tuning device in such a way that when the plug-in part is in an intermediate position that differs from the closed position, the resonant circuit has a resonant frequency that differs from the characteristic closure frequency, and in the closed position it has the characteristic closure frequency, wherein the tuning device acts on the inductance of the electric resonant circuit via two relatively heavy coil core parts that are slidable relative to each other. In the closed position of the coupling, the coil core parts rest against the receiving portion of the receiving part and against the plug-in shaft of the plug-in part. One coil core part also rests against a sealing ring of the sealing unit.

The object underlying the invention is to specify a receiving part of a coupling of the initially cited species that is very stable mechanically, particularly when acted upon by relatively strong acceleration forces.

The object is achieved according to the invention by means of a receiving part of a coupling of the initially cited species having the characterizing features of claim 1.

By virtue of the fact that according to the invention the shape of the coil itself is influenced, greater latitude is obtained in the design of relatively heavy parts, such that even in the presence of high acceleration forces, the long-term mechanical stability of the coupling parts essential for tightness is not adversely affected by the inertia of coupling parts. A coupling of this kind can be disconnected and properly closed again even after relatively long use.

In one embodiment of the invention, the receiving part of the coupling is designed such that, as a difference in shape, the length of the coil in the intermediate position differs from the length of the coil in the closed position.

In a further embodiment of the invention, the receiving part of the coupling is designed such that, as a difference in shape, the diameter of the coil in the intermediate position differs from the diameter of the coil in the closed position.

Further useful configurations of the invention are the subject matter of the dependent claims.

Further useful configurations and advantages of the invention will become apparent from the following description of exemplary embodiments of the invention, read with reference to the figures of the drawings.

Figure 2:
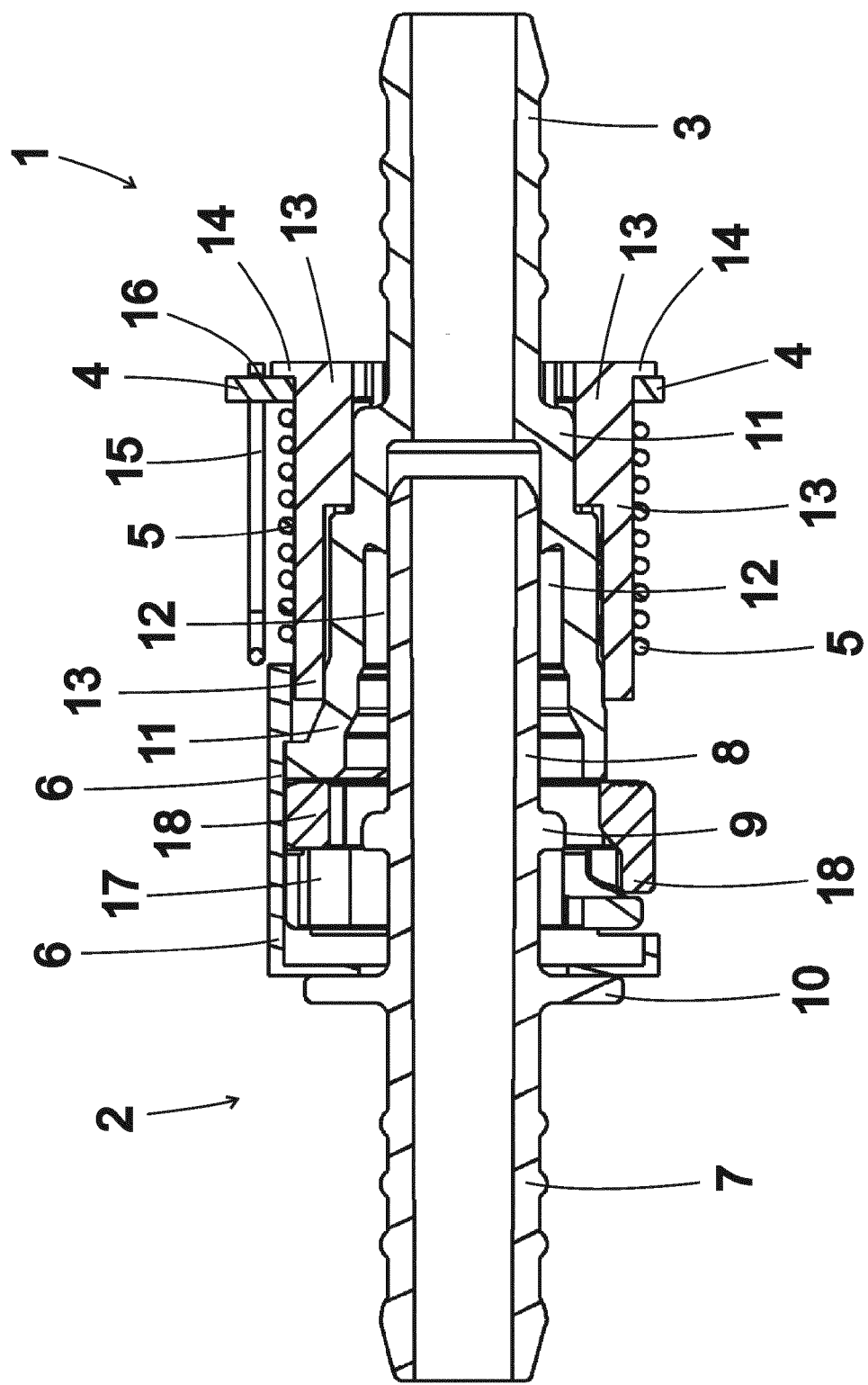
Figure 3:
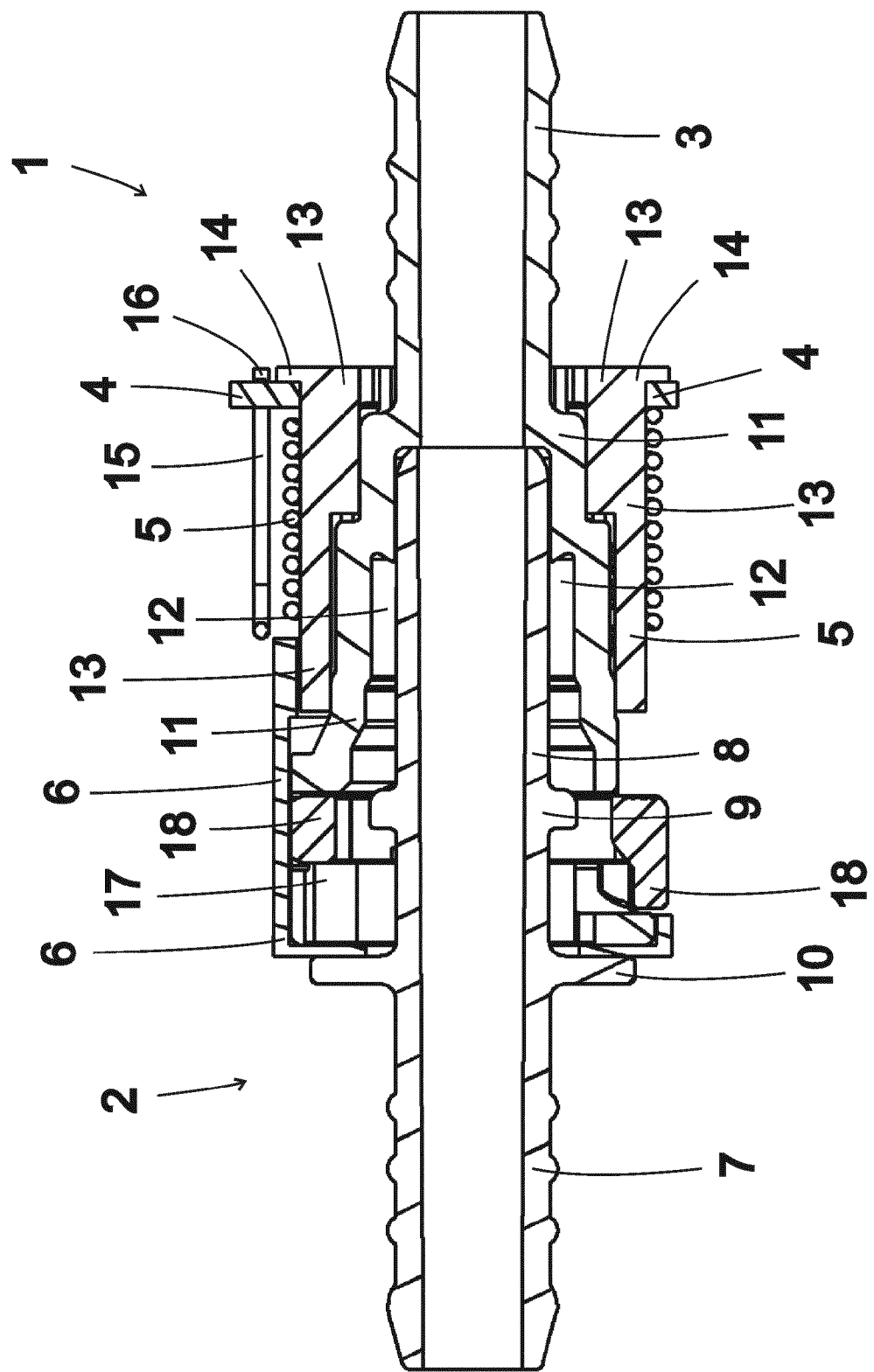
Figure 6:
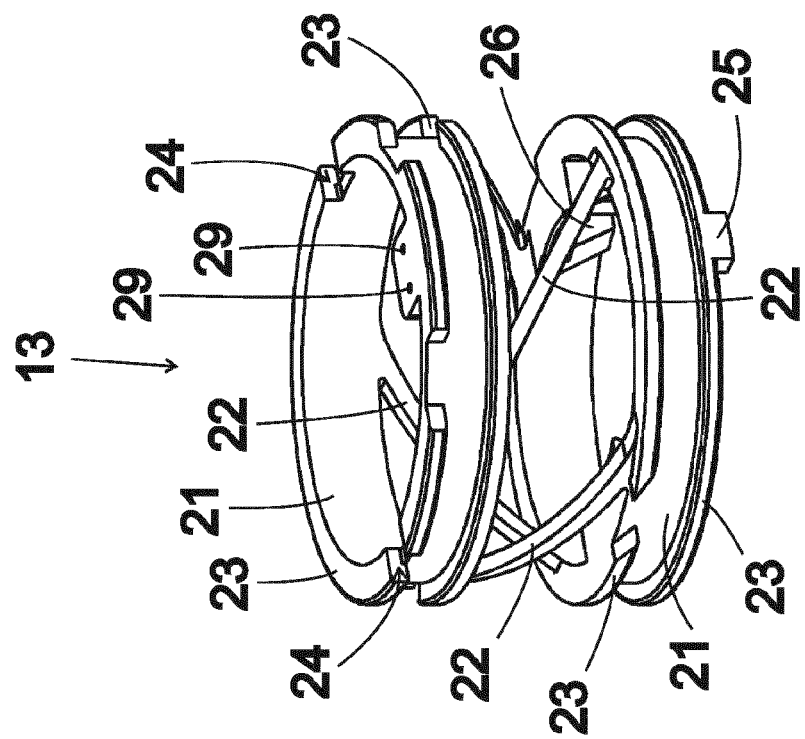
Figure 5:
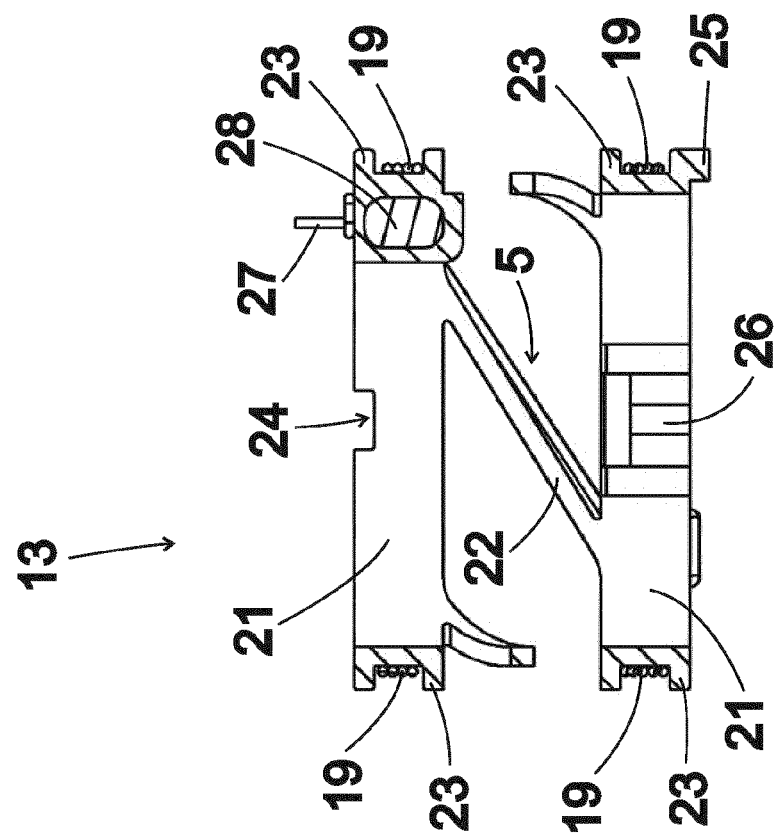
Figure 7:
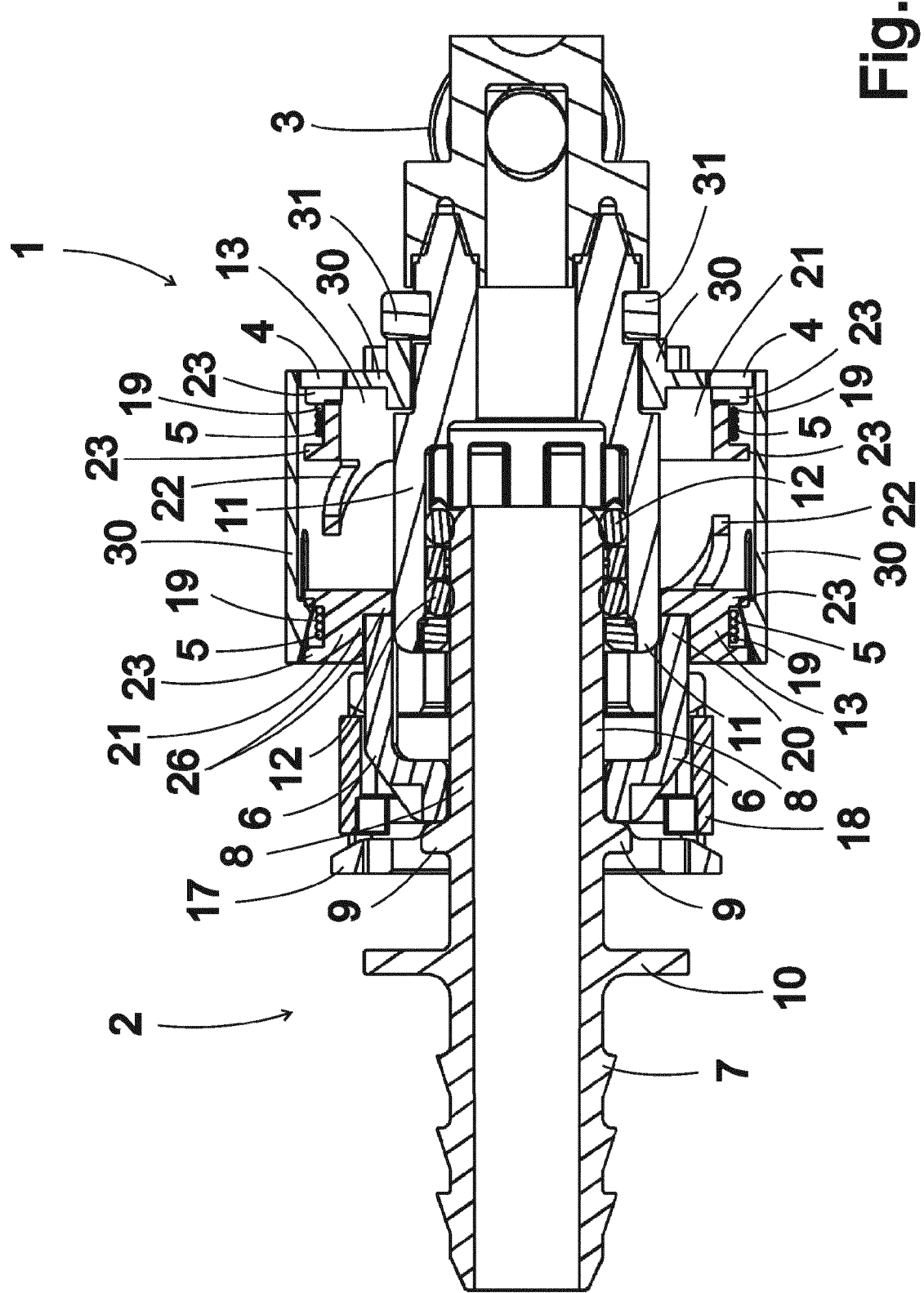
Figure 8:
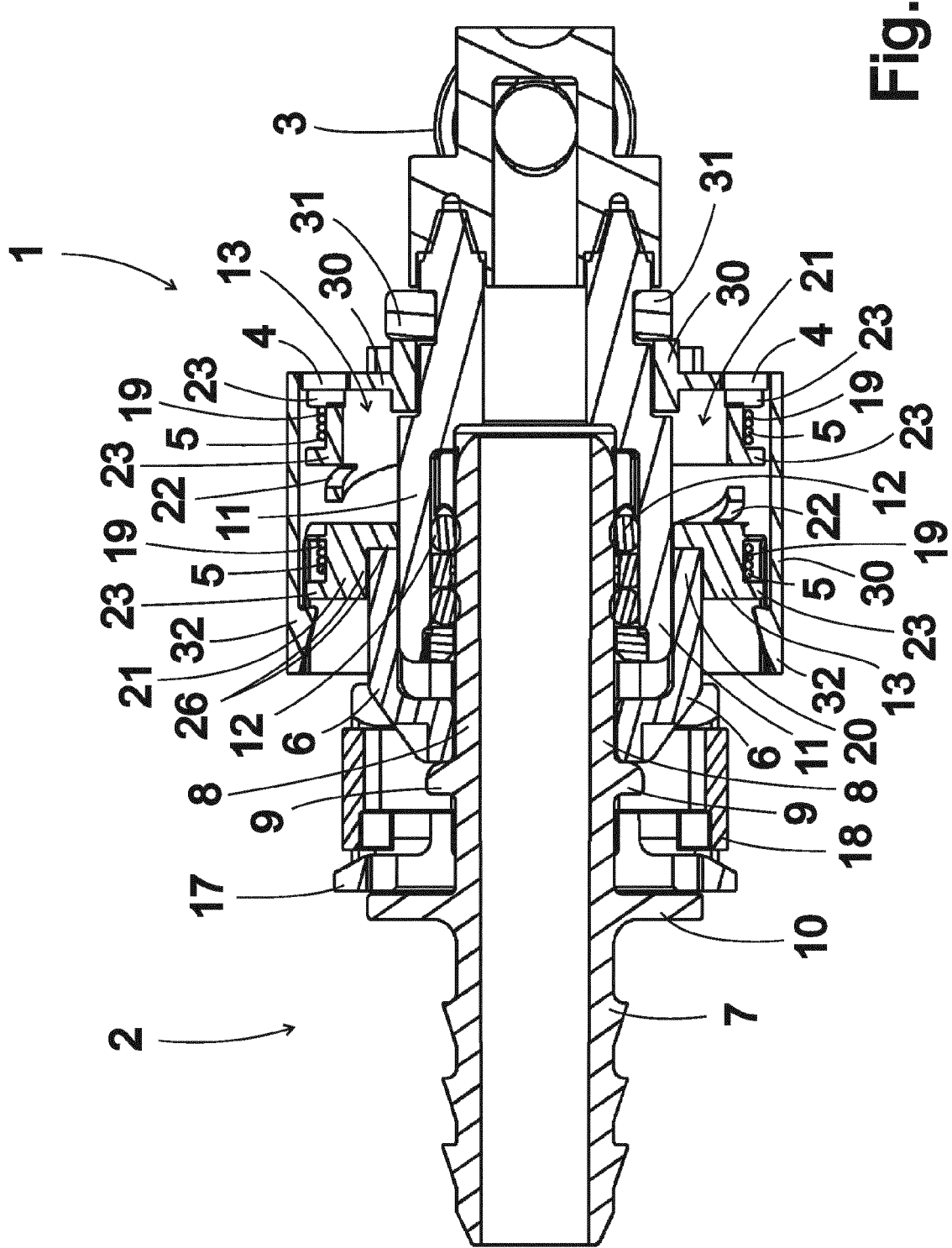
Figure 10:
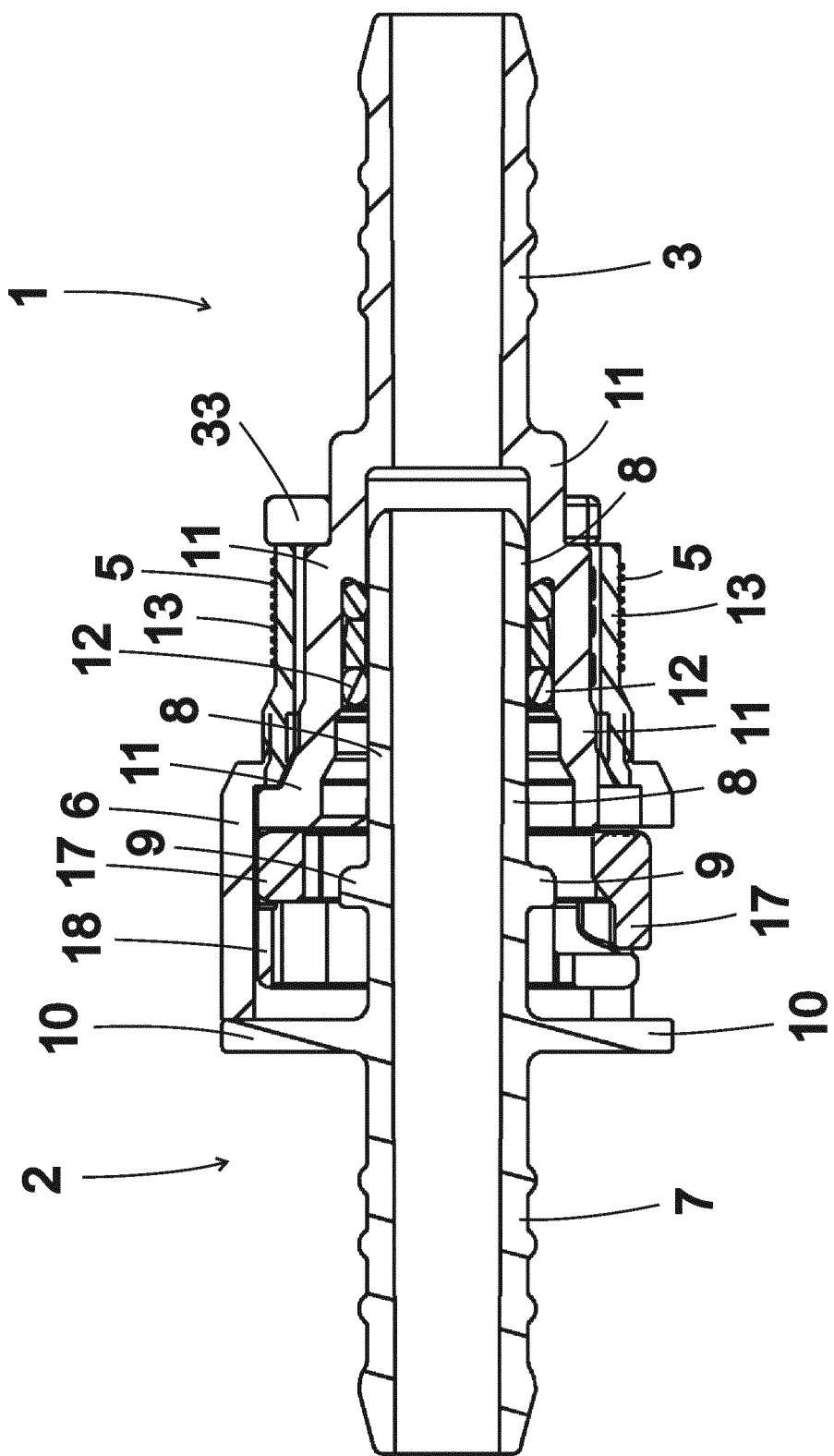
Figure 11:
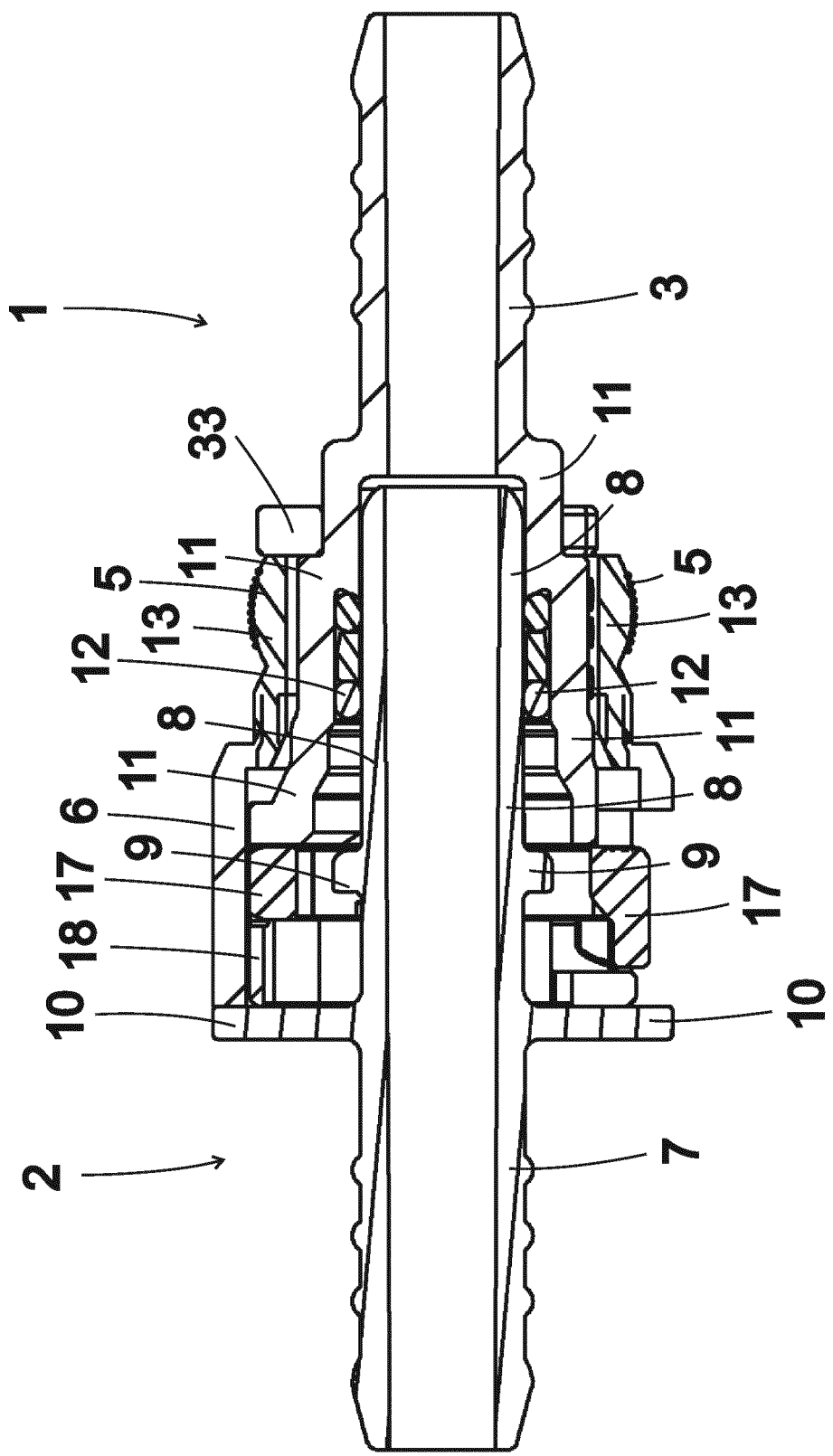

Therein:

FIG. 1 is an exploded perspective view of a first exemplary embodiment according to the invention of a coupling having a receiving part and a plug-in part, in which the length of a coil in the intermediate position differs from the length of the coil in the closed position, FIG. 2 is a longitudinal section of the exemplary embodiment according to FIG. 1 with the plug-in part in an intermediate position, FIG. 3 is a longitudinal section of the exemplary embodiment according to FIG. 1 with the plug-in part in the closed position, FIG. 4 is an exploded perspective view of a second exemplary embodiment according to the invention of a coupling having a receiving part and a plug-in part, in which the length of a coil in the intermediate position differs from the length of the coil in the closed position and in which the coil has two coil part windings that are spaced apart from each other, FIG. 5 is a longitudinal section of a coil carrier in the exemplary embodiment according to FIG. 4, with coil, FIG. 6 is a detailed perspective representation of the coil carrier according to FIG. 5, without the coil, FIG. 7 is a longitudinal section of the exemplary embodiment according to FIG. 4 with the plug-in part in an intermediate position, FIG. 8 is a longitudinal section of the exemplary embodiment according to FIG. 4 with the plug-in part in a closed position, FIG. 9 is an exploded perspective view of a third exemplary embodiment according to the invention of a coupling having a receiving part and a plug-in part, in which the diameter of a coil in the intermediate position differs from the diameter of the coil in the closed position, FIG. 10 is a longitudinal section of the exemplary embodiment according to FIG. 9 with the plug-in part in an intermediate position and FIG. 11 is a longitudinal section of the exemplary embodiment according to FIG. 9 with the plug-in part in the closed position.

FIG. 1 is an exploded perspective view of a first exemplary embodiment according to the invention of a coupling provided to connect ends of a fluid line (not illustrated in FIG. 4 [sic]) and comprising a receiving part 1 and a plug-in part 2. In the exemplary embodiment according to FIG. 1, the receiving part 1 is formed as elongated. It is provided with a connection nozzle 3 at a back end that is to be connected to an end of the fluid line. The receiving part 1 has a capacitor support plate 4 with a capacitor of fixed capacitance, a coil 5 and, as an example of an acting part, a thrust slide 6 that is formed as sleeve-like. The plug-in part 2 is also formed as elongated in the exemplary embodiment according to FIG. 1. It is provided with a connection nozzle 7 at a back end that is to be connected to another end of the fluid line. The plug-in part 2 has a plug-in shaft 8, a latching collar 9 to effect fixation in the receiving part 1, and a pressing collar 10. The receiving part 1 configured in this way permits a high detection range, since its coil 5 has a large diameter and losses in the core of the coil are eliminated.

FIG. 2 is a longitudinal section of the first exemplary embodiment according to FIG. 1 in an intermediate position, in which the plug-in part 2 is inserted by its plug-in shaft 8 into a receiving sleeve 11 of the receiving part 1 until the pressing collar 10 rests against the thrust slide 6, in which arrangement the plug-in shaft 8 rests by its radially outward-facing side against a sealing unit 12 integrated into the receiving sleeve 11.

The receiving part 1 has a coil carrier 13, which is latchably connected to the receiving sleeve 11 on the outer side thereof, and which is configured with a coil support collar 14 at an end facing toward the connection nozzle 3 of the receiving part 1. Resting against the coil support collar 14, on the side facing away from the connection nozzle 3 of the receiving part 1, is the annularly formed capacitor support plate 4. The coil 5 is wound over the coil carrier 13 and is helically formed, it being made of a spring-wire-like material with space between the individual turns and being connected via a coil web 15 to a contact point 16 on the capacitor support plate 4.

To connect the plug-in part 2 to the receiving part 1, the receiving part 1 comprises, connected to the receiving sleeve 11, a retaining spring receiving body 17 with a retaining spring 18.

The thrust slide 6 is slidably mounted on the retaining spring receiving body 17, the receiving sleeve 11 and the coil carrier 13, and rests by its back end against the coil 5. When the plug-in part 2 is inserted into the receiving part 1, once the pressing collar 10 strikes a front end of the thrust slide 6 that is oppositely situated from the back end, the pressing collar 10 pushes the thrust slide 6 over the retaining spring receiving body 17, the receiving sleeve 11 and the coil support 13. In the process, the back end of the thrust slide 6 presses on the coil 5, thus shortening the length of the coil 5.

FIG. 3 is a longitudinal section of the exemplary embodiment according to FIG. 1 in the closed position. The plug-in part 2 is inserted all the way into the receiving sleeve 11 of the receiving part 1, causing the latching collar 9 to latch behind the retaining spring 18. The coil 5 is shortened in length compared to the intermediate position illustrated in FIG. 2, thus changing its inductance.

FIG. 4 is an exploded perspective view of a second exemplary embodiment according to the invention of a coupling provided to connect ends of a fluid line (not illustrated in FIG. 4) and comprising a receiving part 1 and a plug-in part 2. In the exemplary embodiments according to FIGS. 1 to 3 and FIG. 4, mutually corresponding elements are provided with the same reference numerals and will not be described in more detail below. In the exemplary embodiment according to FIG. 4, the coil 5 of the receiving part 1 according to the invention has two coil part windings 19 that are spaced apart from each other. The receiving part 1 comprises a retaining spring receiving body 17, with a retaining spring 18, and, as a further example of an acting part, a thrust slide 6 disposed partially inside the retaining receiving body [sic] 17 and having two thrust slide ends 20, each formed in the manner of a prong and resting against the coil carrier 13.

FIG. 5 is a longitudinal section of the coil carrier 13 from the exemplary embodiment illustrated in FIG. 4. The coil carrier 13 has two winding carriers 21 for receiving the coil part windings 19, which are connected to each other via rod-shaped spring webs 22 extending obliquely between the winding carriers 21. The coil part windings 19 are connected via an electrical line that is part of the coil 5 and runs along a spring web 22. The winding carriers 21 are each formed with a substantially circular cross section and each have a respective winding carrier collar 23 disposed on each of their two sides. One of the winding carriers 21 comprises, on the side facing away from the spring webs 22, latching grooves 24 that serve to ensure exact positioning of the coil carrier 13 during assembly. The other winding carrier 21 comprises, on the side facing away from the spring webs 22, a latching lug 25 that also helps to bring about exact positioning during assembly, as well as thrust grooves 26 located on the inner side of the winding carrier 21 and provided to receive the thrust slide ends 20. The winding carrier 21 formed with the latching grooves 24 surrounds a capacitor 28 equipped with two contact pins 27.

FIG. 6 is a detailed perspective representation of the coil carrier 13 illustrated in FIG. 5, without the coil 5 and contact pins 27. The body of the winding carrier 21 formed with two latching grooves 24 has two contact pin lead-throughs 29, formed in the manner of holes, for the through-passage of the contact pins 27 of the capacitor 28.

FIG. 7 is a longitudinal section of the exemplary embodiment according to FIG. 4 in an intermediate position, in which the plug-in part 2 with the plug-in shaft 8 has been inserted into the receiving sleeve 11 of the receiving part 1 until the latching collar 9 rests against the thrust slide 6, in which arrangement the plug-in shaft 8 rests against a sealing unit 12 integrated into the receiving sleeve 11.

The thrust slide 6 of the receiving part 1 is slidably mounted in the retaining spring receiving body 17 and on the receiving sleeve 11. Each thrust slide end 20 engages in a thrust groove 26 of the coil carrier 13. The receiving part 1 has a coil carrier sleeve 30, which is connected to the receiving sleeve 11 on the outer side thereof and is secured there by a securing ring 31. The winding carrier 21 in whose thrust grooves 26 the thrust slide ends 20 engage is slidably mounted on the receiving sleeve 11 and in the coil carrier sleeve 30. The other winding carrier 21 is mechanically fixedly connected to the coil carrier sleeve 30.

When the plug-in part 2 is inserted into the receiving part 1, once the latching collar 9 strikes the front end of the thrust slide 6, the latching collar 9 pushes the thrust slide 6 and the slidably mounted winding carrier 21, counter to the spring force of the spring webs 22, over the receiving sleeve 11 and thereby shortens the length of the coil carrier 13. This reduces the distance between the coil part windings 19 and thus the length of the coil 5.

FIG. 8 is a longitudinal section of the exemplary embodiment according to FIG. 4 in the closed position. Here, the plug-in part 2 is inserted all the way into the receiving sleeve 11 of the receiving part 1. A retaining collar 32 of the coil carrier sleeve 30 engages slidably mounted winding carrier 21 from behind in order to absorb the relaxation forces exerted on the retaining spring 18 by the spring webs 22. The coil carrier 13 and thus, likewise, the coils 5 are shortened in comparison to the intermediate position illustrated in FIG. 7, thereby changing their inductance.

FIG. 9 is an exploded perspective view of a third exemplary embodiment according to the invention of a coupling provided to connect ends of a fluid line (not shown in FIG. 9) and having a receiving part 1 and a plug-in part 2. In the exemplary embodiments according to FIGS. 1 to 3, FIGS. 4 to 8 and FIG. 9, mutually corresponding elements are provided with the same reference numerals and will not be described in more detail below. In the exemplary embodiment according to FIG. 9, the receiving part 1 has, as an example of an acting part, a thrust slide 6, formed as sleeve-shaped, which on its side facing away from the pressing collar 10 rests against a plastically deformably formed coil carrier 13. A helically formed coil 5 is tightly wound outwardly around the coil carrier 13. The coil carrier 13, on its side facing away from the thrust slide 6, rests against an abutment 33. The abutment 33 is latchably connected to the receiving sleeve 11.

FIG. 10 is a longitudinal section of the exemplary embodiment according to FIG. 9 in an intermediate position in which the plug-in part 2 with the plug-in shaft 8 is inserted into the receiving sleeve 11 of the receiving part 1 until the pressing collar 10 rests against the thrust slide 6, in which arrangement the plug-in shaft 8 rests against a sealing unit 12 integrated into the receiving sleeve 11.

The receiving part 1 comprises, connected to the receiving sleeve 11, a retaining spring receiving body 17 with a retaining spring 18. The thrust slide 6 is slidably mounted on the retaining spring receiving body 17 and the receiving sleeve 11. When the plug-in part 2 is inserted into the receiving part 1, once the pressing collar 10 strikes the thrust slide 6, the pressing collar 10 pushes the thrust slide 6 over the retaining spring receiving body 17 and the receiving sleeve 11 onto the plastically deformable coil carrier 13 and thus regionally changes at least the diameter, but also usually the length, of the coil.

FIG. 11 is a longitudinal section of the exemplary embodiment according to FIG. 9 in the closed position. Here, the plug-in part 2 is inserted all the way into the receiving sleeve 11 of the receiving part 1. The coil carrier 13 is now shortened in comparison to the intermediate position illustrated in FIG. 10 and is bulged radially outward. Compared to the intermediate position illustrated in FIG. 10, the coil 5 regionally has an increased diameter, thus changing its inductance, and likewise usually has a reduced length.

The invention claimed is:

1. A coupling for a fluid line comprising:
a plug-in part;
a receiving part adapted to receive said plug-in part and lock said plug-in part in a closed position, said receiving part comprising an acting part and a tuning device;
an electric resonant circuit connected to said receiving part, said electric resonant circuit having an inductance and comprising a coil and adapted to resonate at a frequency corresponding to a characteristic closure frequency when said plug-in part is in said closed position and exposed to electromagnetic energy,
wherein said electric resonant circuit is permanently closed and said tuning device interacts contactlessly with said resonant circuit and mechanically with said plug-in part and acts on the inductance of the electric resonant circuit, such that:
when said plug-in part is inserted into said receiving part, said acting part acts mechanically on said coil such that the shape of said coil in said closed position differs from the shape of the coil in an intermediate position, and
when said plug-in part is in said intermediate position, said resonant circuit has a resonant frequency that differs from said characteristic closure frequency, and in said closed position has said characteristic closure frequency.

2. The coupling of claim 1, wherein said coil in said closed position has a length that differs from the length of said coil in said intermediate position.

3. The coupling of claim 2, wherein said receiving part further comprises a receiving sleeve and said acting part is configured as a thrust slide that, when said plug-in part is plugged into said receiving part, slides over said receiving sleeve, and acts on said coil such that the length of said coil in said closed position is smaller than the length of said coil in said intermediate position.

4. The coupling of claim 3, wherein when said plug-in part is plugged into said receiving part, said thrust slide slides over a coil carrier disposed between said thrust slide and said receiving sleeve and acts directly on said coil such that the length of said coil in said closed position is smaller than the length of said coil in said intermediate position.

5. The coupling of claim 1, wherein said coil comprises two coil part windings that are spaced apart from each other, wherein the distance between said coil part windings in said closed position differs from the distance between said coil part windings in said intermediate position.

6. The coupling of claim 5, wherein said two coil part windings are received by a separate coil carrier that comprises two winding carriers and at least one spring element disposed between said winding carriers.

7. The coupling of claim 1, wherein said coil in said closed position has a diameter that differs regionally from the diameter of said coil in said intermediate position.

8. The coupling of claim 7, wherein said receiving part further comprises a receiving sleeve and said acting part is configured as a thrust slide that, when said plug-in part is plugged into said receiving part, slides over a receiving sleeve and acts on said coil such that the diameter of the coil in said closed position is at least regionally greater than the diameter of said coil in said intermediate position.

9. The coupling of claim 8 wherein said receiving part further comprises a plastically deformably formed coil carrier that carries said coil and on which, when said plug-in part is plugged into said receiving part, said thrust slide actuates said coil carrier such that said coil carrier bulges radially outward and the diameter of said coil carrier in said closed position is at least regionally greater than the diameter of said coil carrier in said intermediate position.

\* \* \* \* \*